United States Patent Office
3,809,698
Patented May 7, 1974

3,809,698
3-(AMINOALKOXY)-2,3-DIHYDROQUINOBENZOXA OR THIA) ZEPINE DERIVATIVES
Harry L. Yale, New Brunswick, and Ramesh B. Petigara, Somerset, N.J., assignors to E. R. Squibb & Sons, Inc., Princeton, N.J.
No Drawing. Filed Jan. 31, 1972, Ser. No. 222,286
Int. Cl. C07d 51/70
U.S. Cl. 260—268 PC    4 Claims

ABSTRACT OF THE DISCLOSURE

3(-aminoalkoxy)-2,3-dihydroquinobenzoxa (or thia) zepine derivatives are provided having the structures

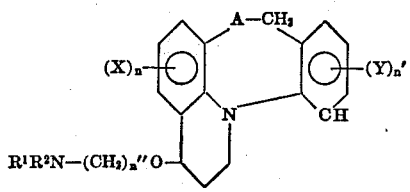

or

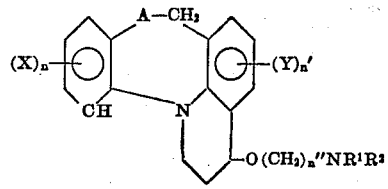

wherein A is O or S and X, Y, $R^1$, $R^2$, $n$, $n'$ and $n''$ are as defined hereinafter. These compounds are useful as anti-inflammatory agents, and central nervous system stimulants or depressants depending on dosage.

---

The present invention relates to 3-aminoalkoxy-2,3-dihydroquinobenzoxa (or thia)zepine derivatives of the structure

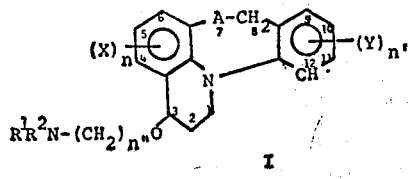

or

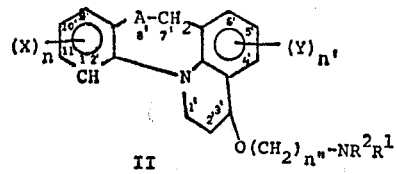

wherein X and Y are the same or different and can be halogen, trifluoromethyl, lower alkyl, cycloalkyl, lower alkylmercapto, lower alkoxy, cyano, isocyanido or di-lower alkylsulfamoyl, A is O or S, $n$ is 0, 1 or 2, $n'$ is 0, 1 or 2 and $n''$ is 1 to 10, and pharmaceutically acceptable acid-addition salts thereof.

The term "lower alkyl" as employed herein includes both straight and branched chain radicals of up to and including eight carbon atoms, for instance, methyl, ethyl, propyl, isopropyl, butyl, s-butyl, isobutyl, pentyl, hexyl, isohexyl, heptyl, 4,4-dimethylpentyl, octyl, 2,2,4-trimethylpentyl and the like.

The term "halogen" includes F, Cl, Br or I.

The lower alkylmercapto groups contain up to eight carbon atoms and include methylmercapto, ethylmercapto, propylmercapto and mercapto radicals containing any of the lower alkyl groups mentioned hereinbefore.

The terms "lower alkyloxy" and "lower alkoxy" are interchangeable and refer to groups containing up to eight carbon atoms and which include any of the lower alkyl groups mentioned hereinbefore attached to an oxygen atom.

The term "cycloalkyl" includes saturated ring systems contain from three to seven carbons such as cyclopropyl, cyclobutyl, cyclopentyl, cyclohexyl and cycloheptyl.

The term "alkenyl" includes mono-unsaturated straight chain or branched chain radicals of less than eight carbons corresponding to "lower alkyl" as defined above.

In the above Formulae I and II, each of the carbocyclic aromatic rings can include 0, 1 or 2 substituents, other than hydrogen. The nature and position of the substituents in the starting materials will determine which isomer, Type I and/or Type II, is obtained.

$R^1$ and $R^2$ may be the same or different and represent hydrogen, lower alkyl, aralkyl and alkenyl; $NR^1R^2$ taken together is a heterocyclic radical having the formula

in which $X'$ represents $NR^4$, O, S or $CH_2$, $r$ represents 1, 2 or 3; $R^4$ represents hydrogen, lower alkyl, hydroxy-lower alkyl, lower alkanoyloxy-lower alkyl, hydroxy-lower alkoxy-lower alkyl, di(lower alkyl)amino-lower alkoxy-lower alkyl, lower-alkylamino-lower alkyl, di-lower akyl amino-lower alkyl, amino-lower alkyl; and $R^3$ represents any of the $R^4$ groups. These may be exemplified by piperidinyl; (lower alkyl)piperidinyl [e.g., 2-, 3- or 4-(lower alkyl)piperidinyl]; (lower alkoxy)piperidinyl; pyrrolidinyl; (lower alkyl)pyrrolidinyl; (lower alkoxy)pyrrolidinyl; piperazinyl; (lower alkyl)piperazinyl (e.g., $N^4$-methylpiperazinyl); di(lower alkyl)piperazinyl; (lower alkoxy)piperazinyl; (hydroxy - lower alkyl)piperazinyl [e.g., $N^4$-(2-hydroxyethyl)piperazinyl]; (lower alkanoyloxyalkyl)piperazinyl [e.g., $N^4$ - (2 - acetoxyethyl)piperazinyl]; (hydroxy-lower alkoxy-lower alkyl)piperazinyl [e.g., $N^4$-[2 - (2 - hydroxyethoxy)ethyl]piperazinyl]; di(lower alkyl)amino-(lower alkoxy-lower alkyl)piperazinyl [e.g., $N^4$-[2-(2-dimethylaminoethoxy)ethyl]piperazinyl]; homopiperazinyl; amino(lower alkyl)piperidinyl [e.g., 3 - (aminoethyl)piperidinyl], lower alkylamino (lower alkyl)piperidinyl [e.g., 2-[(methylamino)ethyl] piperidinyl], di-lower alkylamino(lower alkyl)piperidinyl [e.g., 4-[dimethylamino(methyl)]piperidinyl].

The salts of the compounds of this invention include the acid-addition salts, particularly the non-toxic acid-addition salts. Acids useful for preparing the acid-addition salts, include, inter alia, organic acids, such as oxalic, maleic, fumaric, tartaric, citric, pamoic, acetic, and succinic acid.

As will be seen hereinafter, the compounds of the invention are prepared from starting materials of the structure (III)

Where in the starting material III, $n$ is 1 or 2 and X includes a strongly electronegative group like trifluoromethyl, cyano, isocyanido or di-lower alkylsulfamoyl substituent at the 7-position, and $n'$ is 0, or Y is a substituent at a position other than 3 and 4 in the starting material, cyclization is directed to the 4-position so that the Type II isomer is subsequently formed. However, where X is an ortho-para orienting group like halogen, especially chlorine, and $n$ is 1 or 2 and at least one halogen is at the 7-position of starting material III, or Y is lower alkyl, lower alkyloxy, cycloalkyl or lower alkylmercapto at any position or a strongly electronegative group at a position other than 3, or when $n'$ is 0, a mixture of the Type I and Type II isomers is obtained.

Where in the starting material III, $n'$ is 1 or 2 and Y includes a strongly electronegative group like trifluoromethyl, cyano or di-lower alkylsulfamoyl at the 3-position, and $n$ is 0, or X is a substituent at a position other than 7 in the starting material, cyclization is directed to the 6-position so that the Type I isomer is subsequently formed.

Where in the starting material III, $n'$ is 1 or 2 and Y includes an ortho-para orienting substituent at the 3-position, and $n$ is 0, or X is a substituent at a position other than 7 in the starting material, cyclization is directed to the 6-position so that the Type I isomer is subsequently formed.

Where $n$ and $n'$ are 0, that is where there are no substituents on either aromatic ring, the Type I isomer is obtained, that is (IV)

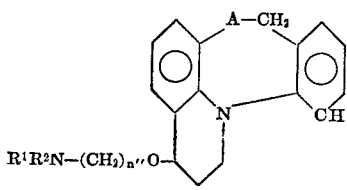

where the starting material does not include substituents at the 3 and/or 7 positions, but does include substituents such as lower alkyl, lower alkyloxy, cycloalkyl or lower alkylmercapto at the 2, 8 and/or 9 positions, the Type I isomer is obtained.

Where the starting material does not include substituents at the 3 and/or 7 positions, but does include strongly electronegative groups at the 1 and/or 9 positions, the Type I isomer is obtained. However, where the starting material includes a strongly electronegative group at the 2 and/or 8 positions, then a mixture of the Type I and Type II isomers is obtained.

Where X represents a strongly electronegative group like trifluoromethyl, cyano or di-lower alkylsulfamoyl and $n$ is 1 or 2 at least one X being at the 7-position of the starting material and Y is lower alkyl, lower alkylmercapto, cycloalkyl or lower alkoxy at any position or any of the above strongly electronegative groups at a position other than 3 in the starting material and $n$ is 0, 1 or 2, the Type II isomer is obtained.

Where X is lower alkyl, lower alkyloxy, cycloalkyl, or lower alkylmercapto and $n$ is 1 or 2 and Y is halogen, trifluoromethyl, cyano, isocyanido or di-lower alkylsulfamoyl, and $n'$ is 1 or 2 at least one Y being at the 3-position of the starting material, the Type I isomer is obtained. In this case, X can be trifluoromethyl or other strongly electronegative group so long as it is not in the 7-position of the starting material as will be seen hereinafter.

Where X is lower alkyl, lower alkyloxy, cycloalkyl or lower alkylmercapto, and $n$ is 1 or 2 and $n'$ in $(Y)_{n'}$ is 0, the Type I isomer is obtained.

Where Y is lower alkyl, lower alkyloxy, cycloalkyl or lower alkylmercapto and $n'$ is 1 or 2 and the $n$ in $(X)_n$ is 0, the Type II isomer is obtained.

Where both X and Y represent lower alkyl, lower alkoxy and/or lower alkylmercapto, at least one of said groups being at the 3 and 7 positions of the starting material, the Type I isomer is obtained.

Preferred are those compounds of Formula I wherein $n=0$ and $n'=0$ and $n''$ is 2 or 3 and $A=0$; those compounds of Formula I wherein $n=0$, $n'=1$ and Y is Cl at the 11-position, and $n=1$, $n'=0$ and $n''$ is 2 or 3 and X is Cl at 4-position and $A=0$ and those compounds of Formula II wherein $n=1$, X is $CF_3$ or Cl at the 11'-poistion, $n'=0$, and $A=0$.

Compounds of the Formulae I and II can be prepared from VII or VIII obtained by reducing a 3-one of the structure

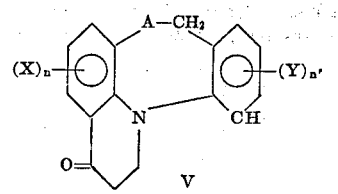

or

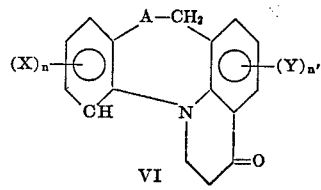

by reacting it with any of the reducing agents, like lithium aluminum hydride and preferably sodium borohydride, to form the corresponding 3-hydroxy compound of the structure

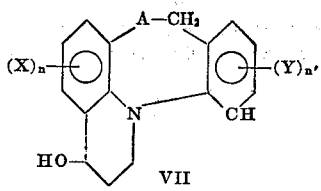

or

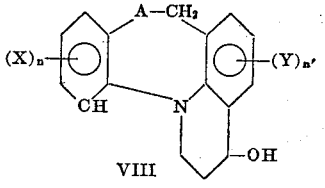

The 3-hydroxy compound (VII or VIII) is treated with a base such as sodium hydride or potassium hydride, in the presence of an aromatic hydrocarbon solvent such as benzene, toluene or xylene, at a temperature within the range of from about 10 to about 130° C. and preferably from about 30° to about 110° C. and the resulting reaction mixture is reacted with a compound of the structure (IX) 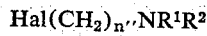 $Hal(CH_2)_{n''}NR^1R^2$ in an aromatic hydrocarbon solvent as described above to form the Formula I or II compounds.

Compounds of Formula I or II can also be prepared as follows. Compounds of Formula VII or VIII are comverted to the corresponding 3-chloro compound by reacting them with anhydrous hydogen chloride in the presence of an anhydrous chloride salt, such as anhydrous barium chloride, anhydrous zinc chloride, or anhydrous calcium chloride, and a non-protic solvent such as any of those mentioned hereinbefore, to form the corresponding 3-chloro compound of the structure

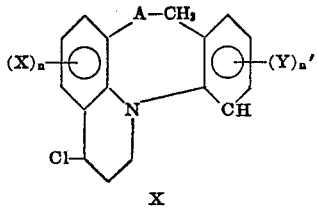

X or

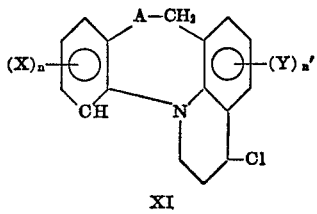

XI

The 3-chloro compounds of structures X and XI can be converted to compounds of Formula I or II of the invention by reacting them with a hydroxy alkyleneamine of the structure XII (XII)     $HO(CH_2)_{n''}NR^1R^2$ Compounds of Formula I or II can also be prepared by treating a 3-hydroxy compound (VII or VIII) with a base such as an alkali metal hydride, such as sodium hydride or potassium hydride, in the presence of an aromatic hydrocarbon solvent, such as benzene, toluene or xylene at a temperature within the range of from about 10° to about 130° C. and preferably from about 30 to about 110° C.; the reaction mixture is treated with a dihaloalkane of the structure (XIII)     $Hal(CH_2)_{n''}Hal^1$ wherein Hal and Hal¹ are different and can be I, Br, Cl, or F, to form a compound of the structure

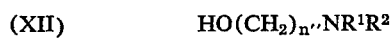 or

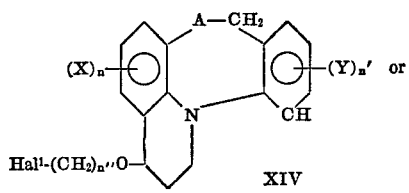

XIV or

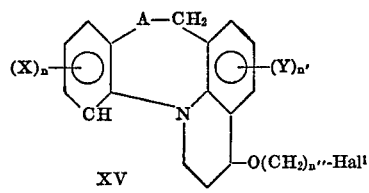

XV

Compound XIV or XV is then reacted with an amine of the structure (XVI)     $HNR^1R^2$ to form compounds of structures I or II.

The 3-one starting materials can be prepared by reacting a compound of the structure (III)

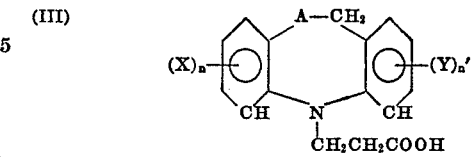

wherein X, Y, n, n', and A are as defined hereinbefore, with a phosphorus pentahalide, such as phosphorus pentachloride, in a molar ratio of III:pentahalide of within the range of from about 0.9:1 to about 1:1, in the absence of oxygen, and in the presence of an inert solvent, such as benzene, toluene, xylene, etc., at a temperature within the range of from about 0 to about 50° C., to form an acyl halide of the structure (XVII)

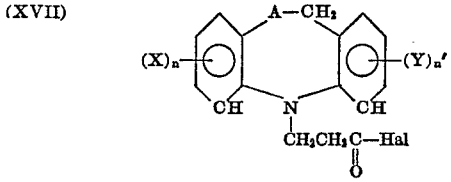

The acyl halide XVII is reacted with anhydrous stannic chloride in a molar ratio of acyl halide XVII:stannic chloride within the range of from about 0.4:1 to about 1:1, at a temperature within the range of from about 20° to about 30° C. to form the Formulae V and VI, 3 or 3'-one compounds depending upon the nature and the position of the X and Y substituents.

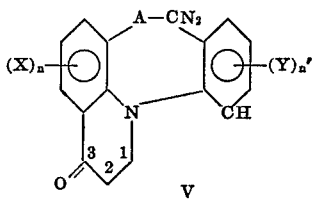

V or

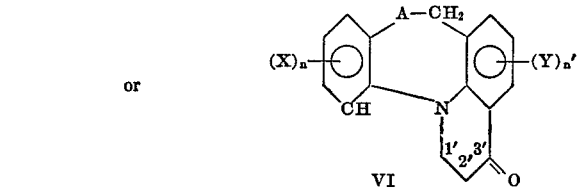

VI

The compounds of Formula V and/or VI can also be prepared by reacting the starting material (III)

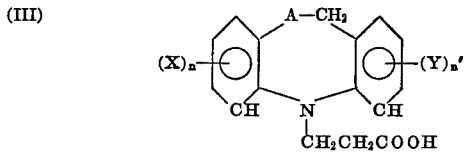

with trifluoroacetic anhydride (preferred) or phosphorus pentoxide, in a molar ratio of III:trifluoroacetic anhydride, or phosphorus pentoxide of within the range of from about 0.9:1 to about 1:1, in the presence of an inert solvent such as benzene, toluene, xylene, pentane, hexane, etc., at a temperature within the range of from about 10° to about 80° C., or with polyphosphoric acid (PPA) in a molar ratio of III:PPA of within the range of from about 1:10 to about 1:25.

The starting materials of Formula III are prepared by a sequence of reactions. First step comprises reacting compounds having the Formula XVIII:

(XVIII) 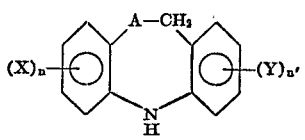

with acrylonitrile to yield compounds of Formula XIX (XIX) 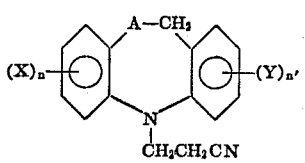

wherein n, n', X, Y and A are as defined herein.

This reaction is carried out by employing an excess of the acrylonitrile as the solvent. The temperature utilized in the reaction can be varied from about 0° to about 100° C. with the prefered range being between about 0° and about 75° C. This reaction proceeds expeditiously when a small amount (up to about 1%) of a strong base like sodium hydroxide, sodium methoxide, potassium t-butoxide, or preferably benzyl trimethylammonium hydroxide (Triton B) is used as the catalyst.

The next step for preparing compounds of Formula III is to treat the compounds of structure XXV with alcoholic hydrogen halide, such as hydrogen chloride in methanol, ethanol, and so forth, at room temperature whereby esters of the structure XX are formed.

(XX) 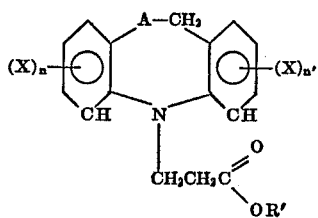

wherein R' is lower alkyl.

By saponifying compound XX with an alkali metal hydroxide, e.g., sodium hydroxide, potassium hydroxide, and so forth, the desired carboxylic acids of structure III can be recovered.

Examples of compounds of Formula XVIII where A is S are set out in U.S. Pats. Nos. 3,188,321 and 3,188,322.

Examples of compounds of Formula XIX where A is O or S can be found in a paper entitled Novel Polycyclic Heterocycles, by Yale et al., J. Med. Chem. 13, 713 (1970).

Examples of compounds of Formulae III, XIII, XIX and XX where A is O can be found in a paper entitled "Novel Polycycle Heterocycles VII," by Petigara and Yale, J. Heterocyclic Chemistry, 8, 455 (1971).

Examples of starting materials which can be employed in preparing the compounds of the invention include, but are not limited to, the following wherein A can be O or S.

(1) 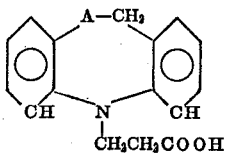

(2) 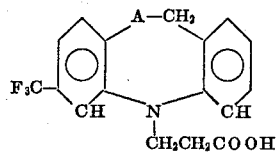

(3) 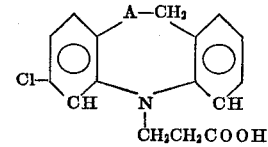

(4) 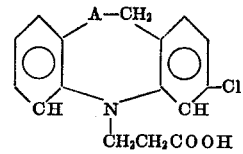

(5) 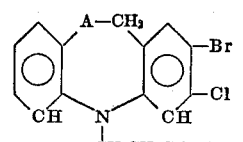

(6) 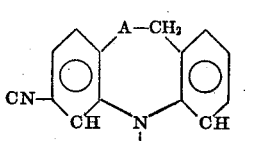

(7) 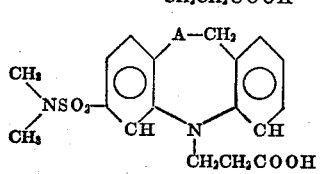

(8) 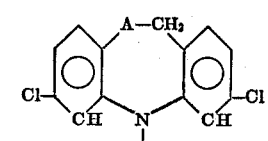

(9) 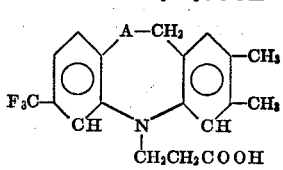

(10) 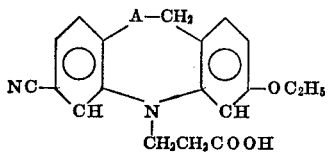

(11) 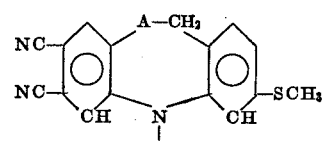

(12) 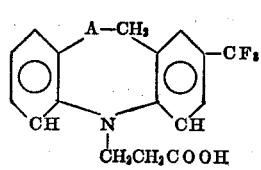

(13) 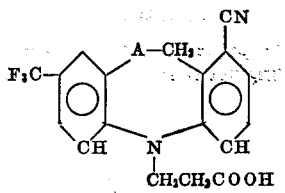

(14) 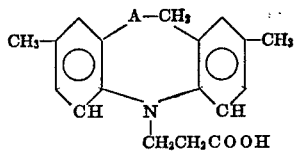

(15) 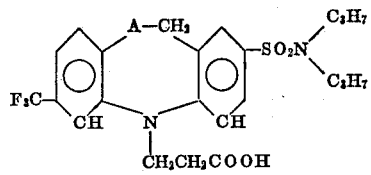

(16) 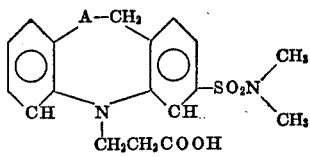

(17) 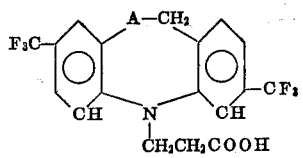

(18) 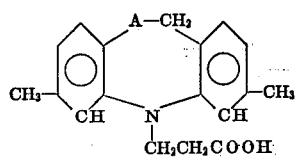

(19) 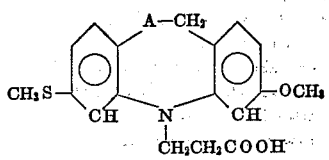

(20) 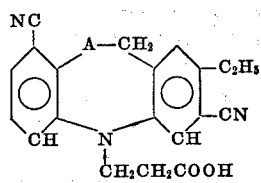

(21) 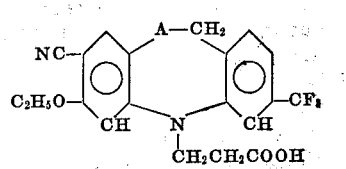

(22) 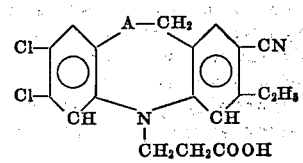

(23) 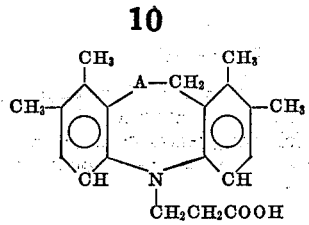

Compounds of this invention are therapeutically active compounds which are useful as central nervous system stimulants or depressants depending upon dosage employed, or as anti-inflammatory agents. For these purposes, they may be administered orally or parenterally in such form as tablets, capsules, injectables, or the like by incorporating the appropriate dosage of the compound with carriers according to accepted pharmaceutical practices.

When the compounds of the invention are employed as central nervous system depressants, the dose for humans would be initially about 200 mg., administered two or three times daily. This level would be maintained for four to six days, and would then be increased to about 400 mg., two or three times daily, for complete therapeutic maintenance. When the compounds of the invention are employed as stimulants, the dose for humans would be initially about 20 mg., administered two to three times daily. This level would be maintained for four to six days, and would then be increased to about 40 mg., two or three times daily for complete therapeutic maintenance.

The compounds of this invention are also useful as anti-inflammatory agents in warm blooded animals in a manner similar to indomethacin. They may be used to decrease joint swelling, tenderness, pain and stiffness, in mammalian species, e.g., in conditions such as rheumatoid arthritis. A compound of Formula I or a physiologically acceptable salt (when applicable) of the character described above may be compounded according to accepted pharmaceutical practice in oral dosage forms such as tablets, capsules, elixirs or powders for administration of about 100 mg. to 1 gm. per day in two to four divided doses.

They may also be used as surface disinfectants. About 0.01 to 1 percent by weight of any of these substances may be dispersed on an inert solid or in a liquid such as water and applied as a dust or spray. They may be incorporated also, for example, in a soap or other cleansing agent, e.g., a solid or liquid detergent, detergent composition, for example, in general cleaning, in cleaning dairy barns or equipment or cleaning food handling or processing equipment.

The following examples illustrate the present invention without, however, limiting the same thereto. All temperatures are expressed in ° C.

EXAMPLE 1

2,3-dihydro-3-[3-(4-methyl)-1-(piperazinyl)propoxy]-11-(trifluoromethyl)-1H,7H - quino[8,1 - cd][1,5]benzoxazepine maleate salt (1:2)

(A) 5,11-dihydro-7-(trifluoromethyl)dibenz[b,e][1,4]oxazepine-5-propionic acid: To 50.0 g. of 5,11-dihydro-7-(trifluoromethyl)dibenz-[b,e][1,4]oxazepine in 60 ml. of redistilled acrylonitrile is added in 5 minutes 0.80 ml. of Triton B. Subsequently, the mixture is heated for one hour under reflux and the product isolated by extraction with benzene to give 5,11-dihydro-7-(trifluoromethyl)dibenz[b,e][1,4]oxazepine-5-propionitrile, M.P. about 161–163°.

7-(trifluoromethyl)-5,11 - dihydrodibenz[b,e][1,4]oxazepine-5-propionitrile, 15.0 g., is dissolved in 240 ml. of dry dioxane and to this 140 ml. of 30% methanolic hydrogen chloride is added. The solution is stirred for 36 hours; 6 ml. of $H_2O$ is added, stirred 0.5 hour, and then concentrated in vacuo to 120 ml. The solid is filtered, and the filtrate is concentrated to dryness in vacuo. The residual liquid is taken up in 200 ml. of diethyl ether, treated with Darco and Hyflo, the diethyl ether solution concentrated and the residue distilled in vacuo to give 13.1 g. 5,11-dihydro-7-(trifluoromethyl)dibenz[b,e][1,4]oxazepine - 5-propionic acid, methyl ester, B.P. about 166–168° (0.08 mm.), M.P. about 70.0–71.5°.

7-(trifluoromethyl)-5,11 - dihydrodibenz[b,e][1,4]oxazepine-5-propionic acid, methyl ester, 3.15 g., is dissolved in 315 ml. of methanol and to this 0.5 g. of potassium hydroxide dissolved in 25 ml. of water is added. The mixture is refluxed for 2.5 hours and then concentrated in vacuo. The residue is taken up in 250 ml. of water and this solution is acidified with 2% aqueous HCl to give 5,11-dihydro-7 - (trifluoromethyl)dibenz[b,e][1,4]oxazepine-5-propionic acid, M.P. about 105–107° C.

(B) 1,2-dihydro-11-(trifluoromethyl)-3H,7H-quino[8,1-c,d][1,5]benzoxazepin-3-one: A solution of 6.86 g. of 5,11-dihydro-7 - (trifluoromethyl)dibenz[b,e][1,4]oxazepine-5-propionic acid in 50 ml. of benzene is cooled to 5–10°. To this is added dropwise with stirring a solution of 4.6 g. of PCl$_5$ in 25 ml. of benzene over a period of 15 minutes. The solution is stirred at 25° for 40 minutes and then at 40–50° for another 20 minutes. The reaction mixture is then heated at 55° for 10 minutes, cooled to 10° and to this is added dropwise with stirring a solution of 12.0 g. anhydrous stannic chloride in 20 ml. of benzene. After stirring 20 minutes at 10° and 20 minutes at room temperature, 100 ml. of ether are added, followed by 10 ml. of concentrated hydrochloric acid, and then 100 ml. of water. After stirring vigorously for 10 minutes, the organic phase is separated, and the aqueous phase is extracted with 100 ml. of ether. The combined organic extracts are washed, dried, filtered, and concentrated to dryness to give 6.9 g. of residue; this is crystallized from 2-propanol to give 4.3 g. of product, M.P. about 140–142°.

(C) 2,3-dihydro-11-(trifluoromethyl)-1H,7H-quino-[8,1-cd][1,5]benzoxazepin-3-ol: A solution of 9.6 g. of 1,2-dihydro-11-(trifluoromethyl)-3H,7H-quino[8,1 - cd][1,5]benzoxazepin-3-one in 200 ml. of dioxane is cooled to 10°, and to this is added a cold solution of 1.2 g. of sodium borohydride in 60 ml. of 25% aqueous dioxane, within 3 minutes. After the addition, the reaction mixture is stirred for 1 hour at room temperature, and then heated on a steam bath. When the temperature reaches 60–65°, the color of the reaction mixture fades and becomes colorless. It is cooled to 10° and to this is added 1000 ml. of cold 2% aqueous hydrochloric acid while stirring. The resultant white solid is filtered, washed with 200 ml. of water, and dried to give 9.3 g. of an off-white solid, M.P. about 120–124°. It is recrystallized twice from a mixture of 50 ml. of benzene and 150 ml. of cyclohexane, to give 8.6 g. the desired carbinol, which melts at about 127–129°.

(D) 2,3 - dihydro-3-[3 - (4 - methyl-1-piperazinyl)propoxy] - 11 - (trifluoromethyl) - 1H,7H - quino[8,1 - cd][1,5]benzoxazepine, maleate salt (1:2): To a solution of 5.8 g. of 2,3-dihydro-11-(trifluoromethyl)-1H,7H-quino[8,1-cd][1,5]benzoxazepin-3-ol in 100 ml. of toluene while stirring, is added 1.0 g. of NaH (50% suspension in mineral oil). Vigorous effervescence of H$_2$ is noticed. The reaction mixture is gently heated under reflux for 45 minutes, then cooled to 10° and to this, is added dropwise, a solution of 3.9 g. of 1-(3-chloropropyl)-4-methylpiperazine in 20 ml. of toluene. The reaction mixture is heated under reflux for 5 hours. Next day, it is filtered and the filtrate concentrated to dryness in vacuo. This gives 9.0 g. of viscous liquid that is dissolved in 200 ml. of warm absolute EtOH, and to this is added a solution of 4.6 g. of maleic acid in 15 ml. of absolute EtOH. Spontaneous precipitation occurs; the mixture is treated with 600 ml. of anhydrous Et$_2$O and the solid filtered with suction to give 12.1 g. of product, M.P. about 165–170°. This is recrystallized from 1100 ml. of absolute EtOH, to give 8.3 g. (66% yield) of the product, M.P. about 170.5–172.5°.

EXAMPLE 2

3 - [2 - (dimethylamino)ethoxy] - 2,3 - dihydro - 11 - (trifluoromethyl) - 1H,7H - quino[8,1-cd][1,5]benzoxazepine, oxalate salt (1:1)

The procedure described in Example 1 is followed in this preparation, using 6.4 g. of 2,3-dihydro-11-(trifluoromethyl) - 1H,7H - quino[8,1-cd][1,5]benzoxazepin-2-ol, 120 ml. of toluene, 1.5 g. of NaH and a solution of about 4.3 g. of 2-(dimethylamino)ethyl chloride in 20 ml. of toluene. Work up of the reaction mixture gives 8.3 g. of viscous liquid residue of the base that does not solidify. This residue is dissolved in a mixture of 25 ml. of absolute EtOH and 50 ml. of anhydrous EtOH and 50 ml. of anhydrous Et$_2$O and to the solution is added a solution of 2.0 g. of oxalic acid in a mixture of 7 ml. of absolute EtOH and 40 ml. of anhydrous Et$_2$O (ethyl ether). The solid is filtered and dried to give 6.6 g. of a product, M.P. about 86–95° dec. This is recrystallized from a mixture of EtOH-Et$_2$O to give 4.4 g. of the product, M.P. about 88–96°. This 4.4 g. of the product is dissolved in 130 ml. of boiling 2-butanone, the solution treated with 1.0 g. of Darco and filtered; the filtrate concentrated under reduced pressure to 40 ml. and cooled. The crystalline solid is filtered, and dried in vacuo at 75° over P$_2$O$_5$ for about 6 hours to give 2.6 g. of the product, M.P. about 140–143° dec. (sintering at 120°).

EXAMPLE 3

3 - [3 - (dimethylamino)propoxy] - 2,3 - dihydro - 11-(trifluoromethyl) - 1H,7H - quino[8,1 - cd][1.5]benzoazepine, maleate salt (1:1)

The procedure of Example 1 is employed substituting 3-(dimethylamino)propyl chloride for 3 - (4 - methyl-1-piperazinyl)propylchloride to prepare the title compound M.P. about 111–113° dec.

EXAMPLE 4

11 - chloro - 2,3 - dihydro - 3 - [3-(piperidinopropoxy)]-1H,7H - quino[8,1-cd][1,5]benzoxazepine maleate salt (1:1)

(A) 7 - chloro - 5,11 - dihydro-dibenz[b,e][1,4]oxazepine-5-propionic acid: To 50.0 g. of 7-chloro-5,11-dihydrodibenz[b,e][1,4]oxazepine in 60 ml. of redistilled acrylonitrile is added in 5 minutes 0.80 ml. of Triton B. Subsequently, the mixture is heated for one hour under reflux and the product isolated by extraction with benzene to give 7-chloro-5,11-dihydro-dibenz[b,e][1,4]oxazepine-5-propionitrile, M.P. about 131–132°.

7 - chloro - 5,11 - dihydrodibenz[b,e][1,4]oxazepine-5-propionitrile, 15.0 g., is dissolved in 240 ml. of dry dioxane and to this 140 ml. of 30% methanolic hydrogen chloride is added. The solution is stirred for 36 hours; 6 ml. of H$_2$O is added, stirred 0.5 hour, and then concentrated in vacuo to 120 ml. The solid is filtered, and the filtrate is concentrated to dryness in vacuo. The residual liquid is taken up in 200 ml. of diethyl ether, treated with Darco and Hyflo, the diethyl ether solution concentrated and the residue distilled in vacuo to give 7-chloro-5,11-dihydrodibenz[b,e][1,4]oxazepine-5-propionic acid, methyl ester, M.P. about 70–72°.

7 - chloro- 5,11 - dihydrodibenz[b,e][1,4]oxazepine-5-propionic acid, methyl ester, 3.15 g., is dissolved in 315 ml. of methanol and to this 0.5 g. of potassium hydroxide dissolved in 25 ml. of water is added. The mixture is refluxed for 2.5 hours and then concentrated in vacuo. The residue is taken up in 250 ml. of water and this solution is acidified with 2% aqueous HCl to give 7-chloro-5,11-dihydro - dibenz[b,e][1,4]oxazepine - 5 - propionic acid, M.P. about 155–157°.

(B) 11 - chloro - 1,2 - dihydro-3H,7H - quino[8,1-cd][1,5]benzoxazepin-3-one: A solution of 6.86 g. of 7-chloro - 5,11 - dihydro-dibenz[b,e][1,4]oxazepine-5-propionic acid in 50 ml. of benzene is cooled to 5–10°. To this is added dropwise with stirring a solution of 4.6 g. of PCl$_5$ in 25 ml. of benzene over a period of 15 minutes. The solution is stirred at 25° for 40 minutes and then at 40–50° for another 20 minutes. The reaction mixture is then heated at 55° for 10 minutes, cooled to 10° and to this is added dropwise with stirring a solution of 12.0 g. anhydrous stannic chloride in 20 ml. of benzene. After stirring 20 minutes at 10° and 20 minutes at room temperature, 100 ml. of ether are added, followed by 10 ml. of concentrated hydrochloric acid, and then 100 ml. of water. After stirring vigorously for 10 minutes, the organic phase is separated, and the aqueous phase is extracted with 100 ml. of ether. The combined organic extracts are washed, dried, filtered, and concentrated to dryness to give 6.9 g. of residue; this is crystallized from 2-propanol to give 4.3 g. of product, M.P. about 140–142°.

(C) 11 - chloro - 2,3 - dihydro-1H,7H-quino-[8,1-cd][1,5]benzoxazepin-3-ol: A solution of 9.2 g. of 11-chloro-1,2 - dihydro - 3H,7H-quino[8,1-cd][1,5]benzoxazepin-3-one in 200 ml. of dioxane is cooled to 10°, and to this is added a cold solution of 1.2 g. of sodium borohydride in 60 ml. of 25% aqueous dioxane, within 3 minutes. After the addition, the reaction mixture is stirred for 1 hour at room temperature, and then heated on a steam bath. When the temperature reaches 60–65°, the color of the reaction mixture fades and becomes colorless. It is cooled to 10° and to this is added 1000 ml., of cold 2% aqueous hydrochloric acid while stirring. The resultant white solid is filtered, washed with 200 ml. of water, and dried to give 8.5 g. of an off-white solid. It is recrystallized twice from a mixture of 50 ml. of benzene and 150 ml. of cyclohexane, to give 7.7 g. of the desired carbinol.

(D) 3,11-dichloro-2,3-dihydro 1H,7H-quino-[8,1-cd][1,5] - benzoxazepine: To a solution of 6.0 g. of 11-chloro - 2,3 - dihydro-1H-7H-quino[8,1-cd][1,5]benzoxazepin-3-ol, in 100 ml. of benzene is added 4.0 g. of anhydrous calcium chloride and into this is slowly bubbled dry hydrogen chloride. The mixture is filtered and the filtrate is concentrated to dryness under reduced pressure to give 5.86 g. of solid. This is recrystallized from petroleum ether (30–60°), to give 4.6 g. of the product.

(E) 11-chloro-2,3-dihydro-3-[3-(piperidinopropoxy)]-1H,7H - quino[8,1 - cd][1,5]benzoxazepine, maleate salt (1:1): To a solution of 2.86 g. of 3-piperidinopropanol in 100 ml. of toluene is added 1.1 g. of NaH (50%) and the mixture is heated under reflux for 30 minutes. This is then cooled to 10° and to it is added dropwise a solution of 3.4 g. of 3,11-dichloro-2,3-dihydro-1H,7H-quino-[8,1-cd][1,5]benzoxazepine in 34 ml. of toluene. The mixture on similar work up as in Example 1 gives the desired product.

EXAMPLE 5

4-chloro-2,3-dihydro-3-[3-(4-hydroxyethyl)-1-(piperazinyl) - propoxy]-1H,8H-quino[1,8-ab][4,1]benzothiazepine, maleate salt (1:1)

(A) 4 - chloro - 1,2 - dihydro-3H,8H-quino[1,8-ab][4,1]benzothiazepin-3-one: To a suspension of 18.0 g. of 7 - chloro - 5,11-dihydrodibenzo[b,e][1,4]thiazepine in 35 ml. of acrylonitrile, cooled to 0–5°, is added with stirring 0.2 ml. of Triton B. The suspension becomes homogeneous, the temperature rises to 10°, and a red solution results. This is allowed to come to 20° and is then heated under reflux for one hour. The excess of acrylonitrile is removed by distillation and the residue is extracted with 5–400 ml. portions of diethyl ether. The diethyl ether extracts are dried and concentrated to about 250 ml., and the colorless product is filtered. The filtrate is concentrated and the resulting solid is again filtered. The yield of the combined solids, 7-chloro-5,11-dihydrodibenzo[b,e]-[1,4]thiazepine-5-propionitrile, is about 22.0 g.

The 7 - chloro-5,11-dihydrodibenz[b,e][1,4]thiazepine-5-propionitrile, 71.0 g., is dissolved in 1200 ml. of dry dioxane and to this 800 ml. of 30% methanolic hydrogen chloride is added. The solution is stirred at 20° for 72 hours, 30 ml. of water is added, the mixture is stirred for 0.5 hour, concentrated in vacuo to about 400 ml., filtered, and the filtrate concentrated to dryness in vacuo to yield 67.5 g. of methyl,7-chloro-5,11-dihydrodibenzo-[b,e][1,4]thiazepine-5-propionate.

The methyl, 7 - chloro - 5,11-dihydrodibenzo[b,e][1,4]thiazepine-5-propionate, 25.0 g., is dissolved in 2200 ml. of methanol and to this is added a solution of 5.6 g. of potassium hydroxide in 300 ml. of water. The solution is heated under reflux for 4 hours, concentrated in vacuo, the residue is dissolved in 600 ml. of water, the solution cooled, and then acidified with 2% aqueous hydrochloric acid. The solid is filtered and dissolved in 600 ml. of benzene. This solution is decolorized and then extracted with 600 ml. of 2% aqueous sodium hydroxide solution. The aqueous extract is acidified with 2% aqueous hydrochloric acid. The solid is filtered and recrystallized from benzene. The yield of 7-chloro-5,11-dihydrodibenzo[b,e][1,4]thiazepine-5-propionic acid is about 22.0 g.

A solution of 7.55 g. of 7-chloro-5,11-dihydrodibenzo-[b,e][1,4]thiazepine-5-propionic acid in 40 ml. of warm benzene is slowly cooled to 35° and while stirring 5.3 g. of trifluoroacetic anhydride is added dropwise. The reaction mixture is heated under reflux for 5 minutes, 50 ml. of benzene is added, and the solution is poured into cold water. The benzene layer is separated, the aqueous phase is extracted with 50 ml. of benzene, and the combined benzene extracts are concentrated to dryness in vacuo. The residue, 7.0 g., M.P. about 110–120°, is dissolved in 325 ml. of a boiling mixture of 2-propanol and cyclohexane (2:3), and then kept at 20° to give two different types of crystals. These are filtered and the yellow transparent rhombic crystals (Compound I) are separated from the darker yellow flat needles (Compound II).

Compound I is recrystallized from 2-propanol-cyclohexane (1:4) to give 2.2 g. of 11-chloro-1,2-dihydro-3H, 7H-quino-[8,1-cd][1,5]benzothiazepin-3-one.

Compound II is recrystallized from 2-propanol-cyclohexane (1:4) to give about 2.6 g. of 4-chloro-1,2-dihydro-3H,8H[1,8-ab][4,1]benzothiazepin-3-one.

4 - chloro - 2,3-dihydro-1H,8H-[1,8-ab][4,1]benzothiazepin-3-ol.

By following the procedure described in Example 4(C), using 10.0 g. of 4 - chloro - 2,3-dihydro-1H,8H-[1,8-ab][4,1]benzothiazepin-3-one, and 1.3 g. of NaBH$_4$, there is obtained 8.2 g. of the desired benzothiazepin-3-ol.

(B) 4 - chloro - 2,3-dihydro-3-[3-(4-hydroxyethyl-1-piperazinyl) - propoxy]-1H,8H-quino[1,8-ab][4,1]benzothiazepine, maleate salt (1:1): To a solution of 5.5 g. of 4 - chloro - 2,3-dihydro-1H,8H-quino-[1,8-ab][4,1]benzothiazepin-3-ol in 100 ml. of toluene is added 1.0 g. of NaH (50%), and the mixture is heated under reflux for 45 minutes, then cooled to 10°. To this is added dropwise, a solution of 3.9 g. of 1-bromo-3-chloropropane and the mixture is heated under reflux for 6 hours. This is cooled, filtered and concentrated to dryness in vacuo to give 5.7 g. of the crude 4-chloro-2,3-dihydro-3-(3-chloropropoxy) - 1H,8H-quino[1,8-ab][4,1]benzothiazepine, as a viscous oil. This oily residue is dissolved in 130 ml. of 2-PrOH and to it are added 3.0 g. of NaI and 5.2 g. of 1-piperazineethanol. The reaction mixture is heated under reflux for about 20 hours, washed and then concentrated to dryness in vacuo. The residue is converted to the maleate salt and is recrystallized from 2-PrOH.

EXAMPLES 6 TO 20

Employing the procedure described in Example 1(A), 1(B), 1(C) but substituting the starting material shown in column A of Table I below, the 3-ol in column B is obtained; employing the procedure of 1(D) but substituting the 3-ol shown in column B and the haloalkylene amine shown in column C, the product shown in column D is obtained.

TABLE I.

| Example number | Column A<br>Starting material | Column B<br>3 or 3'-ol |
|---|---|---|
| 6 | (structure with S—CH$_2$ bridge, F$_3$C substituent, N—CH$_2$CH$_2$COOH) | (structure with S—CH$_2$ bridge, F$_3$C substituent, N—CH$_2$CH$_2$—OH fused) |
| 7 | (structure with O—CH$_2$ bridge, F$_3$C and OCH$_3$ substituents, N—CH$_2$CH$_2$COOH) | (structure with O—CH$_2$ bridge, F$_3$C and OCH$_3$ substituents, N—CH$_2$CH$_2$—OH fused) |
| 8 | (structure with O—CH$_2$ bridge, NC substituent, N—CH$_2$CH$_2$COOH) | (structure with O—CH$_2$ bridge, NC substituent, N—CH$_2$CH$_2$—OH fused) |
| 9 | (structure with S—CH$_2$ bridge, (H$_3$C)$_2$NO$_2$S and CH$_3$ substituents, N—CH$_2$CH$_2$COOH) | (structure with S—CH$_2$ bridge, (H$_3$C)$_2$NO$_2$S and CH$_3$ substituents, N—CH$_2$CH$_2$—OH fused) |
| 10 | (structure with S—CH$_2$ bridge, (C$_2$H$_5$)$_2$NO$_2$S and CH$_3$, CH$_3$ substituents, N—CH$_2$CH$_2$COOH) | (structure with S—CH$_2$ bridge, (C$_2$H$_5$)$_2$NO$_2$S and CH$_3$, CH$_3$ substituents, N—CH$_2$CH$_2$—OH fused) |
| 11 | (structure with S—CH$_2$ bridge, H$_3$C, F$_3$C, CF$_3$ substituents, N—CH$_2$CH$_2$COOH) | (structure with S—CH$_2$ bridge, H$_3$C, H$_3$C, CF$_3$ substituents, N—CH$_2$CH$_2$—OH fused) |
| 12 | (structure with S—CH$_2$ bridge, N—CH$_2$CH$_2$COOH) | (structure with S—CH$_2$ bridge, HO—CH$_2$CH$_2$—N fused) |
| 13 | Same as above | Same as above |

TABLE I.—Continued

| Example number | Column A Starting material | Column B 3 or 3'-ol |
|---|---|---|
| 14 | (structure: phenoxazine with O-CH₃, N-CH₂CH₂COOH) | (structure: corresponding 3-ol with N-CH₂CH(OH)-) |
| 15 | (structure: phenothiazine with S-CH₃, CH₃, H₅C₂-, -C₂H₅, N-CH₂CH₂COOH) | (corresponding 3'-ol) |
| 16 | (structure: phenothiazine with S-CH₃, CF₃, SC₂H₅, N-CH₂CH₂COOH) | (corresponding 3'-ol) |
| 17 | (structure: phenoxazine with O-CH₃, thiophene substituent, N-CH₂CH₂COOH) | (corresponding 3'-ol) |
| 18 | (structure: phenothiazine with S-CH₃, Cl, N-CH₂CH₂COOH) | (corresponding 3'-ol) |
| 19 | (structure: phenothiazine with S-CH₃, Br, N-CH₂CH₂COOH) | (corresponding 3'-ol) |
| 20 | (structure: phenoxazine with O-CH₃, Cl, N-CH₂CH₂COOH) | (corresponding 3'-ol) |

TABLE I

| Example number | Column C Hal(CH₂)ₙ·NR¹R² | Column D Product |
|---|---|---|
| 6 | Cl—(CH₂)₃—N(pyrrolidine) | (structure: phenothiazine with S—CH₃, F₃C—, N—(CH₂)₃—O(CH₃)₃—N pyrrolidine) |

TABLE I.—Continued
| Example number | Column C<br>Hal(CH₂)ₙNR¹R² | Column D<br>Product |
|---|---|---|
| 7 | Br—(CH₂)₂—N⌒N—CH₃ | 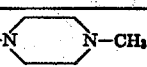 |
| 8 | Cl—(CH₂)₅—N⌒OCH₃ | 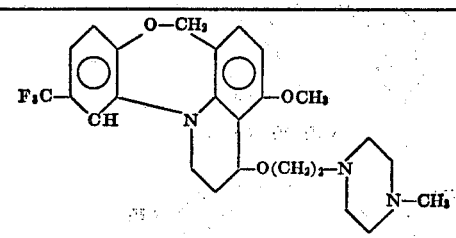 |
| 9 | Cl—(CH₂)₆NHC₂H₅ |  |
| 10 | Cl—(CH₂)₅—N⌒ | 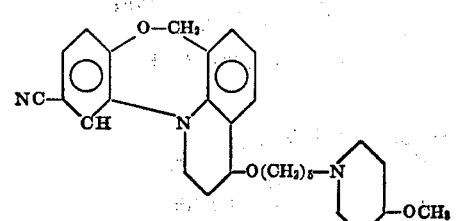 |
| 11 | Cl—(CH₂)₂—N⌒O | 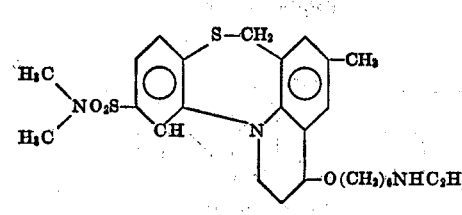 |
| 12 | Br(CH₂)₆—N⌒N—CH₂OCH₂N(CH₃)₂ |  |
| 13 | Cl—(CH₂)₆—N(CH₃)₂ (2,6-dimethylpiperidine) | 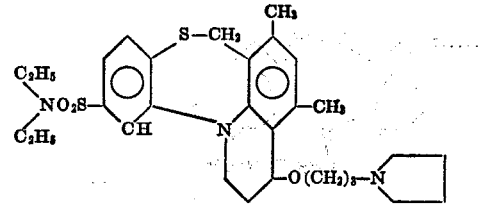 |

TABLE I.—Continued

| Example number | Column C<br>Hal(CH₂)ₙ″NR¹R² | Column D<br>Product |
|---|---|---|
| 14 | Cl—(CH₂)₄—N(C₆H₅)CH₃ | (structure) |
| 15 | Br—(CH₂)₃—N⟨piperidine⟩ | (structure) |
| 16 | Cl—(CH₂)₃—N⟨piperidine⟩ | (structure) |
| 17 | Cl—(CH₂)₂—N(CH₂—C₆H₅)CH₃ | (structure) |
| 18 | Cl(CH₂)₁₀—N⟨morpholine⟩ | (structure) |
| 19 | Br—(CH₂)₂—N⟨piperazine⟩N(CH₂)₂C̈CH₃ | (structure) |
| 20 | Cl(CH₂)₂N(CH₃)₂ | (structure) |

EXAMPLES 21 TO 30

Employing the procedure described in Example 4(A), 4(B), 4(C), 4(D), but substituting the starting material shown in column A of Table II below, the 3-chloro compound in column B is obtained; by reacting the 3-chloro compound with the hydroxyalkylene amine shown in column C, the product shown in column D is obtained.

TABLE II

| Example number | Column A<br>Starting material | Column B<br>3' or 3'-chloro derivative | Column C<br>HO—(CH$_2$)$_n$—NR$^1$R$^2$ | Column D<br>Product |
|---|---|---|---|---|
| 21 | [structure with OCH$_3$, Cl, OH, CH$_3$, CH$_2$CH$_2$COOH] | [3'-chloro derivative structure] | HO—(CH$_2$)$_3$—N(CH$_3$)$_2$ | [product structure with (CH$_3$)$_2$N—(CH$_2$)$_3$O] |
| 22 | [structure with SCH$_3$, Cl, OH, CH$_2$CH$_2$COOH] | [3'-chloro derivative structure] | HO—(CH$_2$)$_3$—N(CH$_3$)C$_2$H$_5$ | [product structure with C$_2$H$_5$(CH$_3$)N(CH$_2$)$_3$O] Plus [second product structure] |
| 23 | [structure with F$_3$C, Cl, SCH$_3$, OH, CH$_2$CH$_2$COOH] | [3'-chloro derivative structure] | HO—(CH$_2$)$_3$—NHCH$_2$CH=CH$_2$ | [product structure with CH$_2$=CHCH$_2$NH—(CH$_3$)$_3$O] |
| 24 | [structure with CF$_3$, OCH$_3$, Cl, OH, CH$_2$CH$_2$COOH] | [3'-chloro derivative structure] | HO(CH$_2$)$_2$—N(morpholine) | [product structure with morpholine-N—(CH$_2$)$_2$O] |

TABLE II.—Continued

| Example number | Column A<br>Starting material | Column B<br>3 or 3'-chloro derivative | Column C<br>HO—(CH₂)ₙ''—NR¹R² | Column D<br>Product |
|---|---|---|---|---|
| 25 | [structure] | [structure] | [structure] | [structure] |
| 26 | [structure] | [structure] | [structure] | [structure] |
| 27 | [structure] | [structure] | HO—(CH₂)₂—NOH₃CH=CH₂<br>CH₃ | [structure] |
| 28 | [structure] | [structure] | HO—(CH₂)₃—N(C₂H₅)₂ | [structure] |
| 29 | [structure] | [structure] | HO—CH₂—NHC₆H₁₁ | [structure] |
| 30 | [structure] | [structure] | HO—(CH₂)₁₀—NHC₂H₄C₆H₅ | [structure] |

EXAMPLES 31 TO 45

Employing the procedure of Example 5, substituting the starting materials of Examples 6 to 20 and reacting them with the following reactants, as per Example (5)(B), set out in Table III below, the products of Examples 31 to 45 are obtained.

TABLE III

| Example number | Hal(CH₂)n″Hal¹ | HNR¹R² |
|---|---|---|
| 31 | Br(CH₂)₃Cl | HN⟨⟩ |
| 32 | I(CH₂)₂Cl | HN⟨⟩N—CH₃ |
| 33 | Br(CH₂)₅—Cl | HN⟨⟩—OCH₃ |
| 34 | I(CH₂)₄Br | H₂NC₂H₅ |
| 35 | I(CH₂)₃F | HN⟨⟩ |
| 36 | Br(CH₂)₃Cl | HN⟨⟩O |
| 37 | I—(CH₂)₅F | HN⟨⟩N—CH₂OCH₂N(CH₃)₂ |
| 38 | F(CH₂)₄Cl | HN⟨⟩(CH₃)₂ |
| 39 | Br(CH₂)₄Cl | HN(C₆H₅)CH₃ |
| 40 | Br(CH₂)₃Cl | HN⟨⟩ |
| 41 | I(CH₂)₂Cl | Same as above |
| 42 | Br(CH₂)₃—Cl | HN(CH₂C₆H₅)CH₃ |
| 43 | Br(CH₂)₁₀Cl | HN⟨⟩O |
| 44 | I(CH₂)₂Br | HN⟨⟩N(CH₂)₃OCCH₃ |
| 45 | I(CH₂)₃Br | HN(CH₃)₂ |

EXAMPLE 46

Following the procedure of Examples 31 to 45, employing as the starting materials

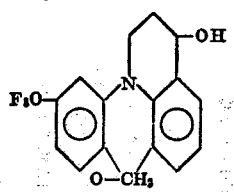

Br(CH₃)₃Cl and

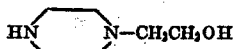

the product obtained has the structure

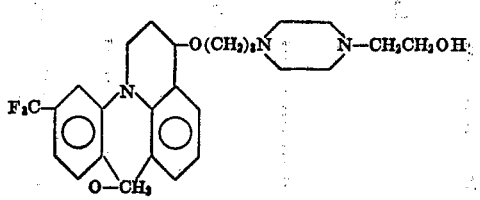

EXAMPLE 47

Following the procedure of Examples 31 to 45, employing as starting materials

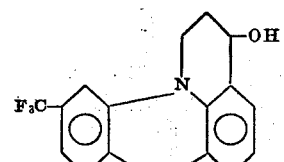

Br(CH₃)Cl and

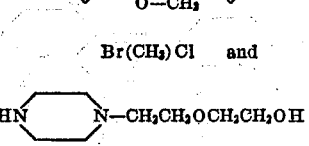
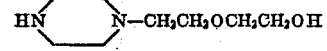

the product obtained has the structure

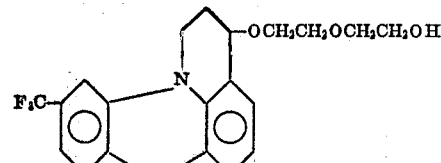

What is claimed is:

1. A compound having the structure

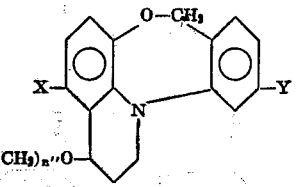

wherein X is hydrogen or chloro, Y is hydrogen or chloro, but at least one of X and Y must be hydrogen, n″ is 2 or 3, and R⁴ is selected from the group consisting of hydrogen, lower alkyl, hydroxy-lower alkyl, lower alkanoyloxy-lower alkyl, hydroxy-lower alkoxy-lower alkyl, amino-lower alkyl, lower alkylamino-lower alkyl, di-lower alkylamino-lower alkyl and di(lower alkyl)amino-lower alkoxy-lower alkyl; wherein lower alkyl refers to an alkyl group having up to eight carbon atoms; or a nontoxic acid-addition salt thereof.

2. A compound having the structure

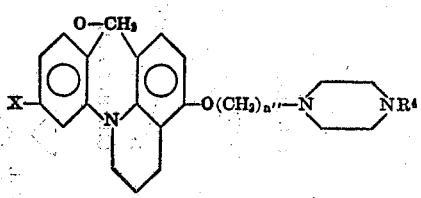

wherein X is trifluoromethyl or chloro, n″ is 2 or 3, and R⁴ is selected from the group consisting of hydrogen, lower alkyl, hydroxy-lower alkyl, lower alkanoyloxy-lower alkyl, hydroxy-lower alkoxy-lower alkyl, amino-lower alkyl, lower alkylamino-lower alkyl, di-lower alkylamino-lower alkyl and di(lower akyl)amino-lower alkoxy-lower alkyl; wherein lower alkyl refers to an alkyl group having up to eight carbon atoms; or a non-toxic acid-addition salt thereof.

3. A compound in accordance with claim 2 having the structure
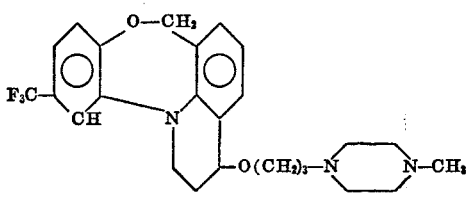
4. A compound in accordance with claim 1 having the structure
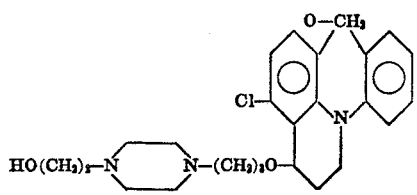
References Cited
UNITED STATES PATENTS
2,919,271  12/1959  Craig _____ 260—283 SY
3,676,445  7/1972   Yale et al. _____ 260—288 R
FOREIGN PATENTS
219,046  1/1962  Austria _____ 260—283 SY
DONALD G. DAUS, Primary Examiner
U.S. Cl. X.R.
260—239 BC, 283 S, 283 SA, 283 SY, 289 R, 293.57, 293.58, 326.81, 327 B, 333; 424—250, 258

// Part 1 of 3

UNITED STATES PATENT OFFICE
CERTIFICATE OF CORRECTION

Patent No. 3,809,698          Dated May 7, 1974

Inventor(s) Harry L. Yale and Ramesh B. Petigara

It is certified that error appears in the above-identified patent and that said Letters Patent are hereby corrected as shown below:

In the title, insert a left parenthesis " ( " before: "OR THIA)"

Column 6, lines 37 to 40, formula V, that portion reading:

Column 7, line 27, the word "prefered" should be: -- preferred --

Column 7, lines 40 to 49, formula XX, that portion reading:

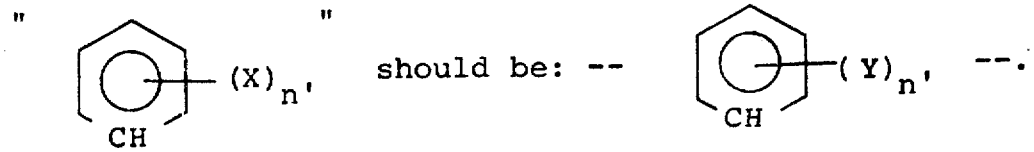

Column 16, Example 8, Column B, that portion of the formula reading:

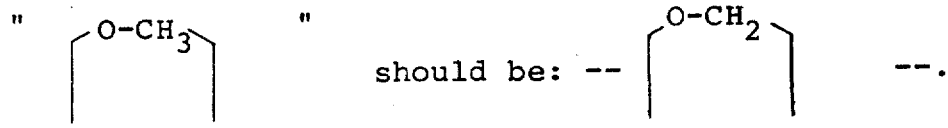

Column 22, Example 17, Column D, that portion of the formula reading:

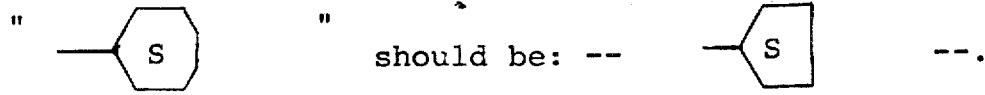

Part 2 of 3

UNITED STATES PATENT OFFICE
CERTIFICATE OF CORRECTION

Patent No. 3,809,698                    Dated May 7, 1974

Inventor(s)  Harry L. Yale and Ramesh B. Petigara

It is certified that error appears in the above-identified patent and that said Letters Patent are hereby corrected as shown below:

Column 25, Example 26, Column C, the formula that reads:

Column 25, Example 27, Column D, that portion of the formula that reads:

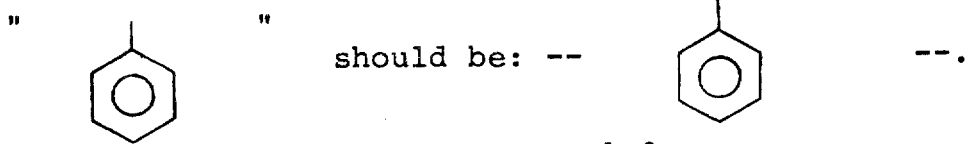

Column 27, Example 41, line 39, Column $NHR^1R^2$, delete the words: "same as above" and insert the following:

Column 27, Example 46, lines 55 to 60, the portion of the formula that reads:

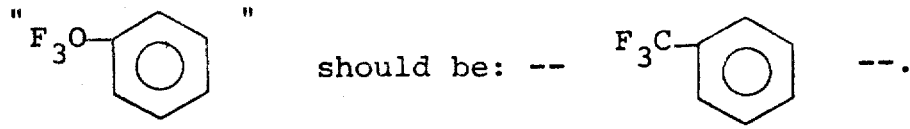

UNITED STATES PATENT OFFICE
CERTIFICATE OF CORRECTION

Patent No. 3,809,698　　　　　　　　Dated May 7, 1974

Inventor(s) Harry L. Yale and Ramesh B. Petigara

It is certified that error appears in the above-identified patent and that said Letters Patent are hereby corrected as shown below:

Column 28, Claim 2, that portion of the formula reading:

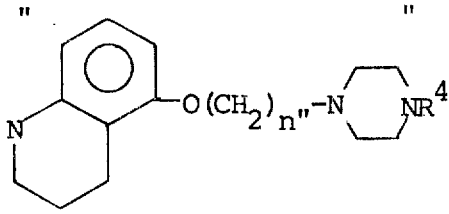　　should be:

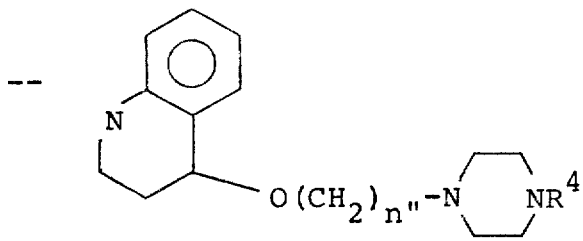

Signed and sealed this 22nd day of October 1974.

(SEAL)
Attest:

McCOY M. GIBSON JR.　　　　　　　C. MARSHALL DANN
Attesting Officer　　　　　　　　Commissioner of Patents